United States Patent Office

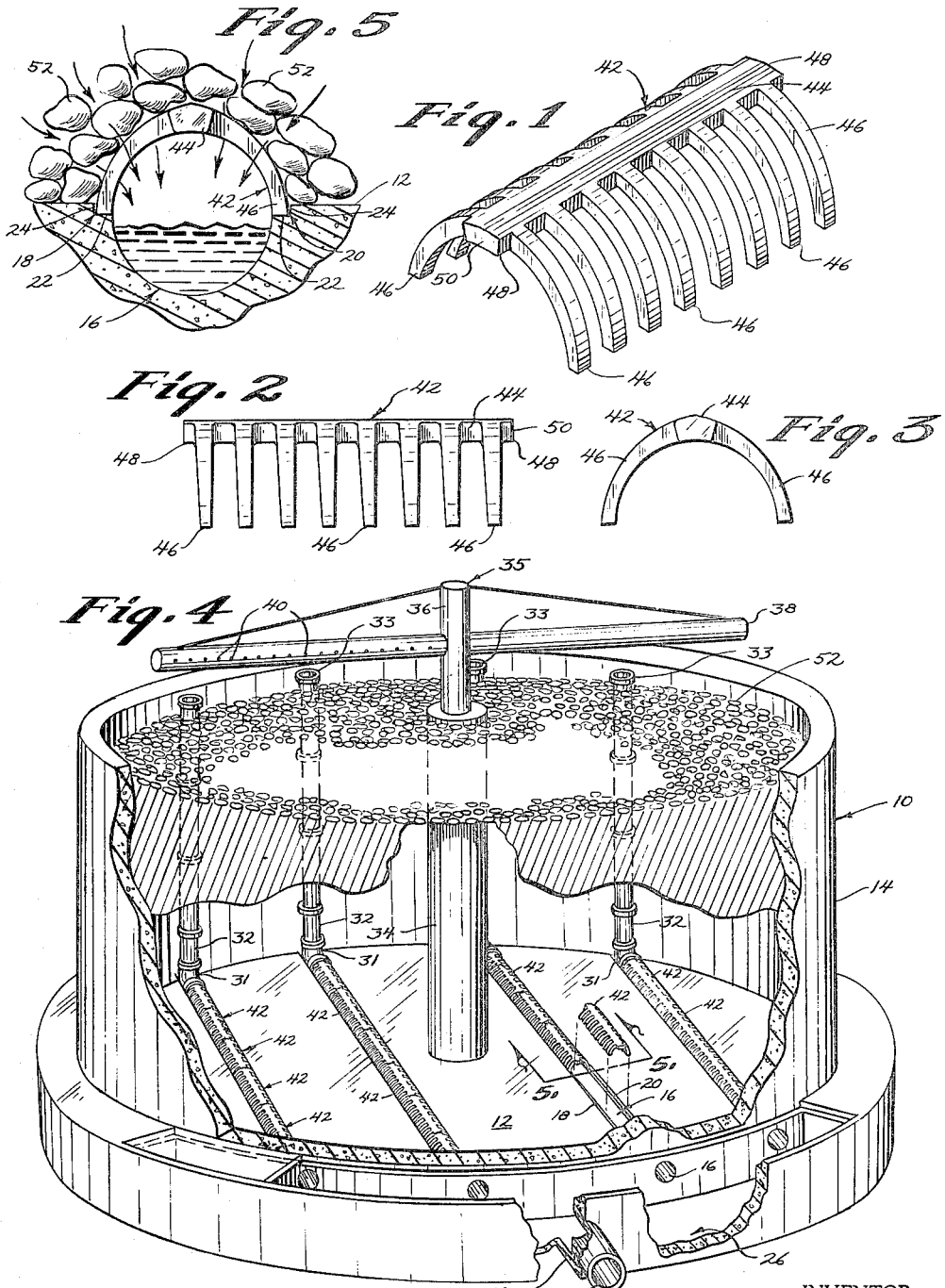

3,247,971
Patented Apr. 26, 1966

3,247,971
UNDERDRAIN FOR FILTER TANKS
Richard F. Kastler, Mason City, Iowa, assignor of one-fourth to Francis E. Holland, and one-fourth to Ralph H. Wallace
Filed Apr. 2, 1962, Ser. No. 184,095
1 Claim. (Cl. 210—291)

Sanitary filter tanks are normally equipped with a plurality of channels in the bottom thereof with one of a variety of underdrains extending thereover to prevent the filter media in the tank from filling the channels. Sometimes the channels and underdrains are combined into a single unitary structure. Some difficulty has been experienced in providing sufficient openings in the underdrain to convey the liquids from the filter media into the channels. Breakage and disalignment of the underdrains while the tank is being filled with filter media have added greatly to the cost of installation, maintenance and operation of these filter tanks.

Therefore, the principal object of my invention is to provide an underdrain for filter tanks which can adequately withhold and restrain the filter media while at the same time provide adequate flow openings.

A further object of my invention is to provide an underdrain for filter tanks which will require a minimum A further object of my invention is to provide an underdrain for filter tanks which will require a minimum number of channels to comply with the requirements of existing sanitary codes.

A still further object of my invention is to provide an underdrain for filter tanks which can be easily installed.

A still further object of my invention is to provide an underdrain for filter tanks which will not be disengaged from or disaligned with the channels as the filter media is being introduced into the tank.

A still further object of my invention is to provide an underdrain for filter tanks which is structurally strong to withstand the weight of the filter media.

A still further object of my invention is to provide an underdrain for filter tanks that will permit easy venting of the channels, and will permit easy flushing.

A still further aspect of my invention is to provide an underdrain that is economical of manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claim, and illustrated in the accompanying drawings, in which:

FIG. 1 is a perspective view of one of my underdrain units;

FIG. 2 is a side elevational view of the underdrain unit shown in FIG. 1;

FIG. 3 is an end elevational view of the underdrain unit shown in FIG. 1;

FIG. 4 is a partial perspective view of a filter tank in which my underdrain units are mounted; and FIG. 5 is a sectional view through a channel as viewed on line 5—5 of FIG. 4.

I have used the numeral 10 to generally designate a concrete filter tank which is primarily comprised of a substantially horizontal floor 12 and vertical cylindrical wall 14. A plurality of parallel and elongated channels 16 are formed in floor 12 and a slight differential in elevation exists between the opposite ends of each channel. The channels can assume any desired cross-sectional shape, such as the semicircular shape shown in FIG. 5. Also, as shown in this figure, recessed shoulders 18 and 20 extend along the top side edges of the channels, and these shoulders present a horizontal shelf or supporting surface 22 with a vertical lateral side 24. The area of floor 12 in between channels 16 may be pitched slightly so as to insure proper drainage into the channels. The lower end of each of the channels 16 terminates in and communicates with a collection chamber 26 which extends at least part way around the periphery of floor 12 and the lower periphery of wall 14. The floor 28 in chamber 26 is pitched whereby fluid collecting therein will flow outwardly through the discharge conduit 29. Hollow L-shaped tiles 31 are mounted within the "high" ends of channels 16 and a plurality of straight hollow tiles 32 are supported on the tiles 31 to create vents 33 for the channels. A vertical supporting post 34 is mounted on and extends upwardly from the center of floor 12. The sewage or fluid to be filtered is sprinkled evenly into the tank 10 by any suitable device, such as by rotary distributor 35. Distributor 35 includes a supporting means 36 rotatably secured in any convenient fashion to the top of post 34. A horizontal arm 38 is secured to supporting means 36 and the fluid involved, which is in communication with the interior of arm 38, is adapted to be sprayed through holes 40 in the arm as the arm and supporting means rotate on the vertical areas of post 34.

The underdrain unit 42 shown in FIG. 1 is of cast metal and is therefore of unitary construction. Underdrain 42 has an elongated horizontal bar 44 wiith a plurality of arcuate-shaped arms 46 extending outwardly and downwardly from opposite sides thereof in semicircular fashion. The lower ends of arms 46 terminate in a horizontal plane. With reference to FIG. 2, it is seen that the arms 46 are equally spaced and the distance between the arms is substantially the same as the width of the arms at a point adjacent bar 44. As shown in FIGS. 2 and 3, the arms 46 become progressively smaller in cross section as they extend outwardly and downwardly, and among the advantages of this design is that the casting operation is facilitated. The taper of the lower ends of arms 46 is clearly shown in FIG. 2. The ends 48 of bar 44 project slightly from the nearest adjacent pair of arms 46. These ends 48 project a distance equal to half the distance between adjacent pairs of arms 46 so that when a plurality of underdrain units are placed in end to end abutting relation, the spacing of pairs of arms 46 will be constant and uniform. As shown in FIGS. 1 and 2, the ends 48 on bar 44 are "square" and present a vertical abutting surface 50.

When the floor 12, wall 14, post 34 and related equipment have been constructed and installed, the vents 33 can be created in the manner described at the "high" ends of channels 16. A plurality of underdrains 42 are thereupon mounted in abutting relationship over each of the channels 16, and the rows of underdrains created thereby extend from the L-shaped tiles 31 on vents 33 to the points where the channels 16 pass through wall 14 into collection chamber 26. As shown in FIG. 5, the lower ends of arms 46 on underdrains 42 are adapted to rest on the supporting surface 22 of shoulders 18 and 20, and the sides 24 of these recessed shoulders serve to hold the underdrains against lateral movement.

After the filter media has been placed in the tank, the filter media 52 of rock or the like is placed in tank 10. Since pairs of arms 46 are of cast metal and form a structural arch, the underdrains 42 will easily withstand the impact and weight of the filter media, even though considerable open space is presented between the pairs of arms. As a consequence, no breakage of underdrains will be experienced. The great strength of arms 46 allows a greater open space or drainage space to be created per lineal foot of underdrain, and this characteristic provides the minimum "open" areas required by underdrain sanitary codes without an excesisve number of underdrains and channels being used. By comparison, when structurally weak clay tile with few openings is used as underdrains, the rows of underdrain tile are usually side by side and substantially cover the tank floor.

After the filter media has ben placed in the tank, the rotary distributor 35 is permitted to function in conventional fashion to sprinkle the fluid involved over the filter media. The fluid then finds its way down through the filter media, thence through the openings between pairs of arms 46 in underdrains 42, and thence into the channels 16. The fluid then drains from the channels 16 into the collection chamber 26, and thence departs therefrom through discharge conduit 29.

It is seen that I have provided an underdrain unit that has great strength characteristics and which, because of its shape, can be easily cast. The abutting relation of the installed underdrains and their supporting shoulders along the channels insure that the underdrains will not be inadvertently moved. The great flow openings provided by these underdrains will substantially reduce the number of underdrains and channels required in a given filter tank. Thus, it is seen that my invention will accomplish at least all of its stated objectives.

Some changes may be made in the construction and arrangement of my underdrain for filter tanks without departing from the real spirit and purpose of my invention, and it is my intention to cover by my claim, any modified forms of structure or use of mechanical equivalents which may be reasonably included within their scope.

I claim:

In a filter system,
- a tank structure having vertical side walls and a substantially horizontal bottom,
- said bottom of said tank being comprised of a concrete slab,
- a plurality of elongated channels formed in the concrete slab of said tank bottom,
- a recessed shoulder formed in said concrete slab adjacent the extreme upper edges of said channels,
- underdrain elements mounted in abutting relation over said channels and being supported on said shoulders adjacent said channels,
- each of said underdrains comprising an elongated bar,
- a plurality of spaced apart arms extending from said bar downwardly to and in supporting engagement with said shoulders on opposite sides of said channels, whereby said shoulders will support said underdrain elements and hold them against lateral movement, and said arms being progressively tapered from said bar to their lower ends wherein the lower ends thereof will have a smaller cross-section than the upper ends thereof, and
- said arms on opposite sides of said bar substantially defining a semicircle and each arm defining substantially the quadrant of a circle and elongated spaces between said arms terminating adjacent said bar at the top of said underdrain structure and at said shoulders formed in said concrete slab.

References Cited by the Examiner
UNITED STATES PATENTS

| | | | |
|---|---|---|---|
| 1,544,617 | 7/25 | Wagner | 210—293 |
| 1,892,842 | 1/33 | Kimberling | 210—293 |
| 2,387,101 | 10/45 | Walker | 210—293 |
| 3,028,967 | 4/62 | Dannenbaum | 210—151 X |

FOREIGN PATENTS 27,232  1906  Great Britain.

REUBEN FRIEDMAN, *Primary Examiner.*

HERBERT L. MARTIN, *Examiner.*